Nov. 20, 1923.
C. D. YOUNG
1,474,700
RAIL JOINT INSULATION
Filed May 25, 1921
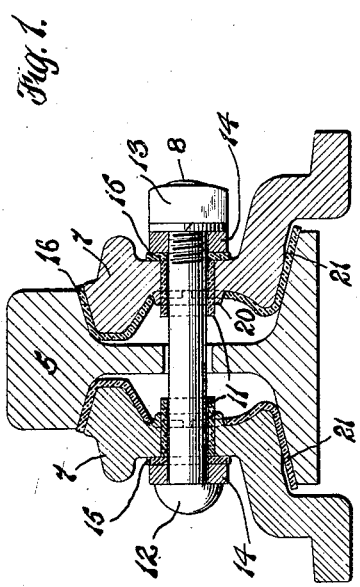
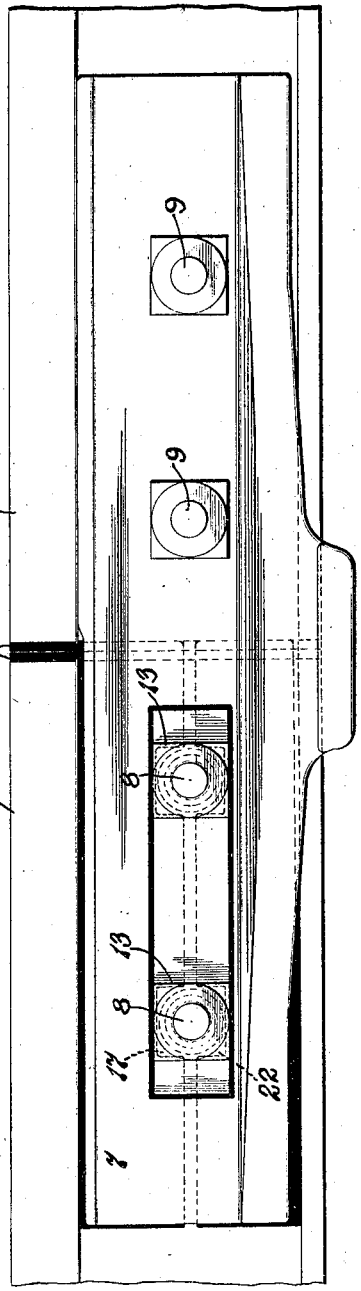
Inventor
Charles D. Young
By Attorneys Patented Nov. 20, 1923.

1,474,700

UNITED STATES PATENT OFFICE.

CHARLES D. YOUNG, OF PHILADELPHIA, PENNSYLVANIA.

RAIL-JOINT INSULATION.

Application filed May 25, 1921. Serial No. 472,567.

*To all whom it may concern:*

Be it known that I, CHARLES D. YOUNG, a citizen of the United States, residing at Philadelphia, in the county of Philadelphia and State of Pennsylvania, have invented certain new and useful Improvements in Rail-Joint Insulations, of which the following is a specification.

My invention relates to rail joint insulation adapted for electrically separating track sections or "blocks" according to the requirements of electrically controlled signaling systems. I aim to secure the insulation interposed between a rail length and the joint bars used in forming the joint against displacement in a simple, effective and convenient manner. How these and other advantages can be secured through my invention will appear from the following description of the best form of embodiment of the invention at present known to me.

In the drawings, Fig. 1 is a cross-section through the insulated portion of a rail joint conveniently embodying my invention, taken as indicated by the line 1—1 in Fig. 2.

Fig. 2 is a side elevation of such a joint.

The joint shown in the drawings comprises meeting rail lengths 5, 6, and a pair of joint bars or fish-plates 7, 7 secured at opposite sides of the rail ends by bolts 8, 8 and 9, 9. The bars 7, 7 may be of the type or construction shown in my copending application Serial No. 422,566, filed May 25, 1921, and described hereinafter. Between the end surfaces of the rails 5, 6 are insulating sheets 10, 10 corresponding in outline to the rail section. Surrounding the bolts 8, 8 within their holes through the bars 7, 7 are insulating sleeves 11, which project inwardly somewhat from the inner faces of the webs of the bars. Beneath the heads and nuts 12, 12 and 13, 13 of the bolts 8, 8 are metal washers 14, and between these washers and the outer faces of the bar webs are interposed insulating strips 15, 15.

Between the inner faces of the bars 7, 7 and the sides of the rail 5 are interposed insulating sheets or liners. As shown, these liners are divided horizontally along the line of the bolt holes, so that their upper portions 16, 16—which wear out first by the more severe battering to which they are subjected in consequence of their relation to the head of the rail—can be separately renewed. Each of the upper liner portions or sections 16 has its lower edge notched at 17, 17 to provide recesses for engaging protuberances 20, 20 on the inner side or face of the corresponding bar 7 adjacent its bolt-holes, to keep the liner in proper position on the bar. As shown, the protuberances 20, 20 are in the form of annular ridges or fillets surrounding the bolt holes. The notches 17, 17 are shown as rectangular, for the sake of clearness of illustration. It will be seen that the notches 17 engage the fillets 20 and effectually keep the liner or liner section 15 from shifting lengthwise with reference to the bar.

The lower liners or sections 21 are kept in proper position on the bar and prevented from shifting lengthwise with reference to it by engagement of notches or recesses 22 fitting about the protuberances 20 in a similar manner.

This mode of securing the liners 15 and 21 on the bars 7, 7 is wholly independent of the bolts 8, 8, and thus facilitates the proper assembling of the joint, since it prevents accidental shifting of a liner lengthwise of a bar when the latter is placed in position. It also obviates risk of damage to displaced liners by forcible insertion of bolts.

The joint bars are of the type shown and described and claimed in my copending application Serial No. 466,081, filed May 2, 1921. The bars are of varying sections having maximum mass and width at the middle and diminishing gradually on either side thereof, producing a bar in which the fibre stress under the deflection of wheel load is distributed substantially uniformly longitudinally throughout the bar. I have found that with such a bar the insulating liners have longer life as a result of a more uniform distribution of wear.

I claim:

1. The combination of a rail joint bar, holding bolts therefor, and an insulating liner, said bar and liner having interengaging portions adjacent said bolts adapted to prevent shifting of the liner, but being otherwise free for relative movement lengthwise of the bar.

2. The combination of a rail joint bar having a protuberance on its inner side, and an insulating liner on the inner side of said bar having a recess engaged with said protuberance to keep the liner in proper position on the bar.

3. The combination of a rail joint bar with a protuberance on its inner side adjacent its bolt-hole, and an insulating liner on the inner side of said bar having a recess engaged about said protuberance to keep the lines from shifting lengthwise with reference to said bar.

4. The combination of a rail joint bar with protuberances on its inner side surrounding its bolt-holes, and an insulating liner on the inner side of said bar having in its edge notches engaged on said protuberances to keep the liner from shifting lengthwise with reference to said bar.

In testimony whereof, I have hereunto signed my name.

CHARLES D. YOUNG.